US005590457A

United States Patent [19]

Ninchi

[11] Patent Number: 5,590,457

[45] Date of Patent: Jan. 7, 1997

[54] TERMINAL INSERTION GUIDING APPARATUS

[75] Inventor: Ryuji Ninchi, Shizuoka, Japan

[73] Assignee: Yazaki Corporation, Tokyo, Japan

[21] Appl. No.: 529,193

[22] Filed: Sep. 15, 1995

[30] Foreign Application Priority Data

Sep. 26, 1994 [JP] Japan .................................... 6-229517

[51] Int. Cl.$^6$ ........................... B23Q 15/00; H01R 43/20

[52] U.S. Cl. ................................ 29/721; 29/709; 29/747

[58] Field of Search .................................. 29/33 M, 709, 29/720, 721, 747, 748, 760, 707; 269/903

[56] References Cited

U.S. PATENT DOCUMENTS

| | | | |
|---|---|---|---|
| 3,706,134 | 12/1972 | Sweeney et al. | 29/629 |
| 4,318,222 | 3/1982 | Fröhlich | 29/721 |
| 4,575,931 | 3/1986 | Jonca | 29/709 X |
| 4,727,637 | 3/1988 | Buckwitz et al. | 29/721 X |
| 4,980,967 | 1/1991 | Ishida et al. | 29/707 X |
| 5,007,160 | 4/1991 | Ishida et al. | 29/721 X |
| 5,018,269 | 5/1991 | Ishida et al. | |
| 5,110,307 | 5/1992 | Rapoza | 29/843 X |
| 5,198,983 | 3/1993 | Blake et al. | 29/721 X |
| 5,477,606 | 12/1995 | Igura | 29/748 X |

FOREIGN PATENT DOCUMENTS

| | | | |
|---|---|---|---|
| 0242876A2 | 10/1987 | European Pat. Off. . | |
| 135481 | 11/1978 | Japan | 29/721 |

*Primary Examiner*—Peter Vo
*Attorney, Agent, or Firm*—Armstrong, Westerman, Hattori, McLeland & Naughton

[57] ABSTRACT

A terminal insertion guiding apparatus includes an optical fiber sensor adapted to transmit light through a terminal cavity of the housing of a connector, thereby indicating to the operator a cavity into which a wire-crimped terminal is to be inserted. The apparatus is provided with a drive mechanism which drives the optical fiber to move back-and-forth in directions X and Y so as to position the optical fiber sensor correctly below a specified cavity. The drive mechanism is controlled by signals from a controller, which signals are indicative of positions of the optical fiber sensor. A pair of first guide rails extend in parallel in direction Y. A slider carries the optical fiber thereon and moves along the first guide rails. The slider is driven by a first belt arrayed between two pulleys to move along the first guide rails. A block carries the first guide rails, slider, first belt and pulleys thereon, and is movably supported on a spline shaft extending transversely of the first guide rails and a second guide rail which is parallel to the spline shaft. The block is driven by a second belt to move along the spline shaft.

8 Claims, 8 Drawing Sheets

TERMINAL INSERTION GUIDING APPARATUS

FIELD OF THE INVENTION

The present invention relates to a terminal insertion guiding apparatus in which an optical fiber sensor is adapted to transmit light through a terminal cavity of a housing of a connector, thereby indicating to the operator a cavity into which a wire-crimped terminal is to be inserted.

PRIOR ART

FIGS. 8 and 9 show one form of conventional apparatuses for inserting terminals into a plurality of housings for connectors that constitute a wire harness. FIG. 8 shows sample housings $\mathbf{52}_1$–$\mathbf{52}_n$ of a sample harness 54 aligned on a sample-platform 51. FIG. 9 shows a wire-carrying bank 55 that holds a variety of colored wires 53 having terminals $\mathbf{53}_1$–$\mathbf{53}_n$ crimped thereto. The operator inspects the shapes of the sample housings $\mathbf{52}_1$–$\mathbf{52}_n$ and the colors of the wires inserted into the sample housings to identify the correct wire before the operator inserts the wire into a production housing. Then, the operator picks up the correct wire from one of the wire-carrying banks 55 and then inserts the terminal into the correct terminal cavity $\mathbf{56}_1$–$\mathbf{56}_n$ of the housing corresponding to the cavity of the sample harness 54. The wires differ from each other in color, for example, red, white, black, yellow, green, and so on. The respective wire-carrying banks carry wire-crimped terminals $\mathbf{53}_1$ to $\mathbf{53}_n$, and are aligned in the order of insertion prior to the insertion operation of the wires, so that the wires can be inserted into the cavities, for example, from the lower left end to the upper right end of a sample housing $\mathbf{52}_1$, then a sample housing $\mathbf{52}_2$, and so on, in FIG. 9. The operator carefully inserts the wire into the correct cavity while distinguishing by inspection the correct cavity from the other cavities. The operator checks for wrong insertion of terminal each time the operator inserts a terminal into the housing. However, the aforementioned conventional apparatus involves wires of many colors in order to prevent the operator from inserting the wire into the wrong cavity. This results in more complex management and manufacture of wires. Moreover, the prior art apparatus necessitates specific samples of housings having wires inserted thereinto for a specific model of wire harness. Therefore, specific samples for corresponding sub harnesses must be manufactured and installed in the manufacturing line prior to insertion operation of the wires. In addition, the samples must be stored somewhere after use.

In order to sequentially insert the wires 53 from lower leftmost cavity to upper rightmost cavity of the housing 52, the wires 53 having terminals crimped thereto must be properly aligned before insertion operation of the wires. This results in poor manufacturing efficiency. Further, the operator must be well trained and familiar with specific samples of sub harnesses. Thus, frequent changes of insertion procedure from one model to another are not practical. The insertion operation needs to be carried out where the samples are installed. If the insertion operation is to be carried out at another place, then the samples must be moved to that place.

SUMMARY OF THE INVENTION

An object of the present invention is to provide a terminal insertion guiding apparatus in which no sample connectors having wires of many colors inserted thereto are required, and wires need not be placed on the wire-carrying banks in a specific order for a specific model of wire harness.

Another object of the present invention is to provide a terminal insertion guiding apparatus in which wires are prevented from being inserted into the wrong cavities and the apparatus can be promptly set up for another model of harness.

A still other object of the invention is to provide a terminal insertion guiding apparatus that allows more freedom in terms of working area.

A terminal insertion guiding apparatus includes an optical fiber sensor adapted to transmit light through a terminal cavity of a housing of a connector, thereby indicating to the operator a cavity into which a wire-crimped terminal is to be inserted. The apparatus is provided with a drive mechanism which drives the optical fiber sensor to move back and forth in directions X and Y so as to position the optical fiber sensor immediately below a specified cavity. The drive mechanism is controlled by signals from a controller, the signals being indicative of positions of the optical fiber sensor. A pair of first guide rails extend in parallel in the direction Y, and carry a slider thereon. The slider carries the optical fiber sensor thereon and moves along the first guide rails. The slider is driven by a first belt arrayed between pulleys to move along the first guide rails. A block carries the first guide rails, slider, first belt and pulleys thereon, and is movably supported on a spline shaft and a second guide rail. The spline shaft and second guide rail extend transversely of the first guide rails. The block is driven by a second belt to move along the spline shaft.

BRIEF DESCRIPTION OF THE DRAWINGS

Features and other objects of the invention will become more apparent from the detailed description of the preferred embodiments with reference to the accompanying drawings in which.

DETAILED DESCRIPTION OF PREFERRED EMBODIMENT

Operation

Figure 1:
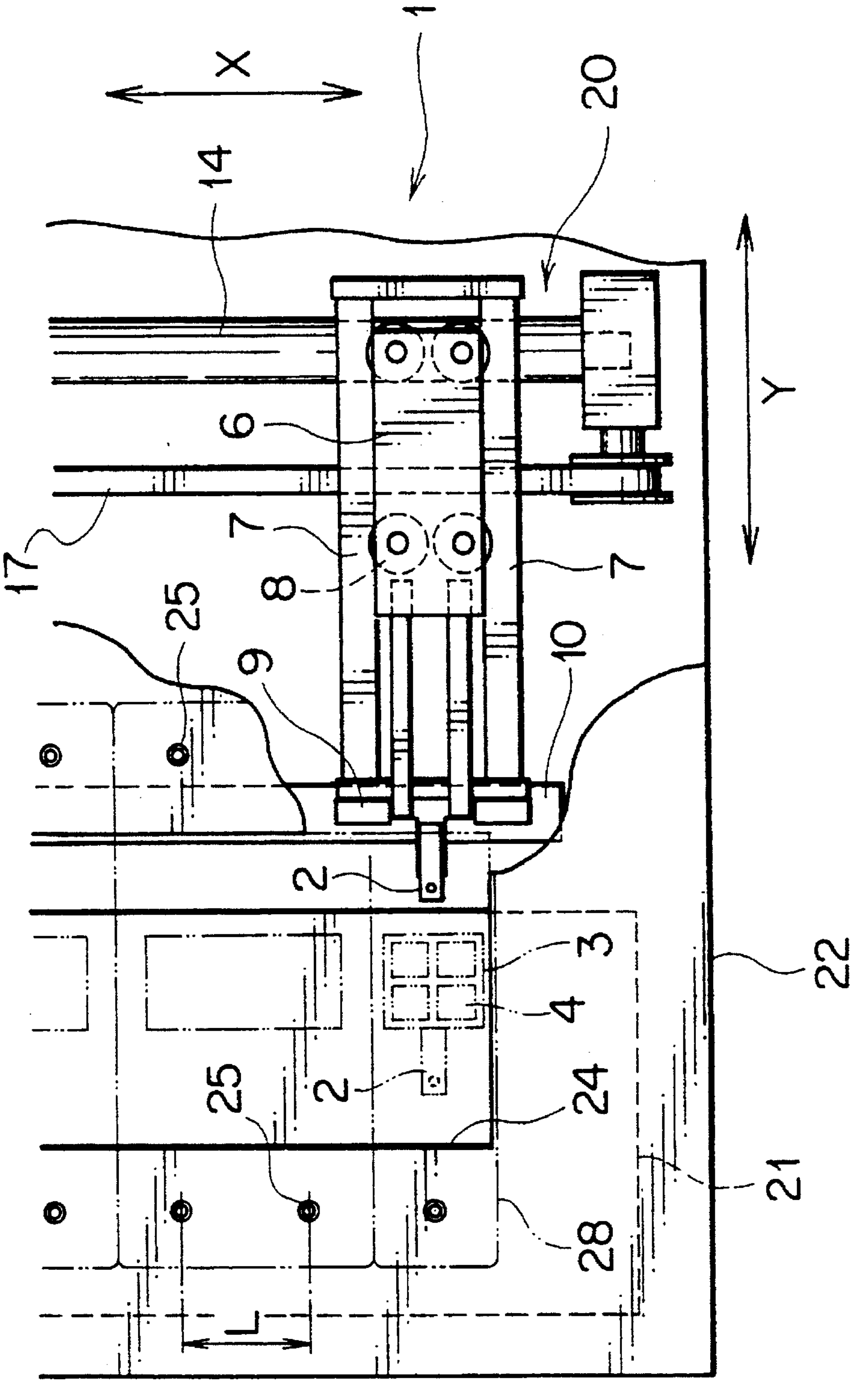
FIG. 1 is a top view of an embodiment of a terminal insertion guiding apparatus of the invention.

A drive mechanism 20 drives a slider 6 having an optical fiber sensor 2 thereon by way of a belt to cause the optical fiber sensor 2 to move orthogonally in the direction Y along the guide rails 7 and in the direction X along the spline shaft 14 to a specified terminal cavity 4, so that the optical fiber sensor 2 illuminates from under the specified terminal cavity 4 of a housing 3 into which a wire is to be inserted. The optical fiber sensor 2 senses the terminal when the terminal is inserted into the cavity 4, and is then moved to another position to indicate the next cavity 4 into which the next wire is to be inserted. The optical fiber sensor 2 also serves as a pacemaker to the operator for most efficient insertion operation.

The opening 24 in the connector-receiving plate 28 receives the housing in position. The connector-receiving plate 28 engages positioning-pins 25 which are aligned at equal intervals L. A larger housing is received by a connector-receiving plate having a larger width on which engagement holes 29 and 30 are provided at intervals of a multiple of the pitch L of positioning pins 25.

EXAMPLE

Figure 2:
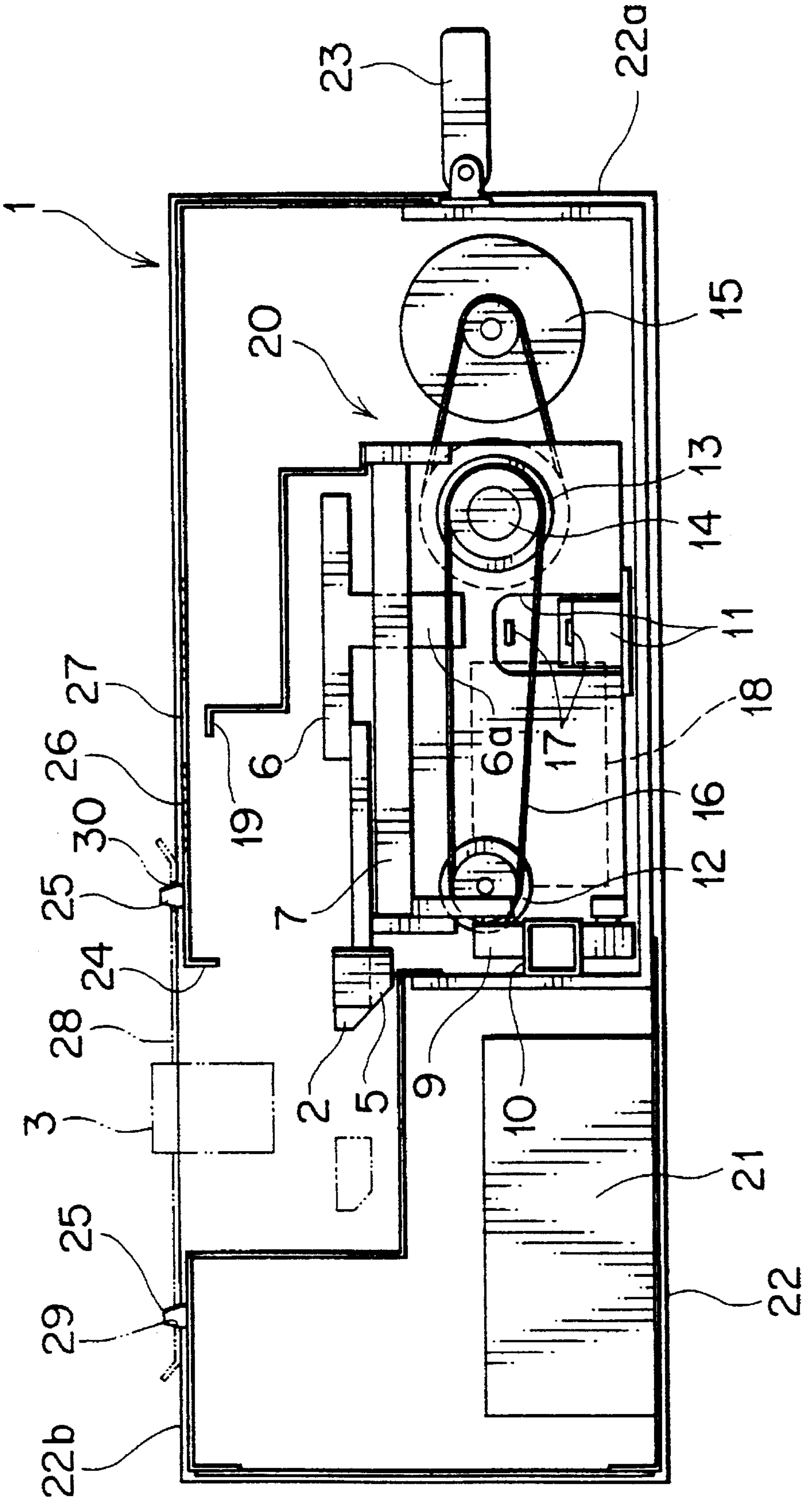
FIG. 2 is a cross-sectional side view of FIG. 1.

FIG. 1 is a top view of a terminal insertion guiding apparatus according to the invention and FIG. 2 is a cross-sectional side view of FIG. 1.

With the terminal insertion guiding apparatus 1, an optical fiber sensor 2 is adapted to move in the directions X and Y to illuminate a specified terminal cavity from under a housing 8 so as to indicate to the operator the right cavity into which a terminal having a wire crimped thereto is to be inserted.

The optical fiber sensor 2 may conveniently be in the form of FD type available from SUNX. In the embodiment, a prism type lens is used to direct light from the horizontally laid optical fiber sensor 2 upward.

The optical fiber sensor 2 is driven by a drive mechanism 20 having a slider 6 thereon movable in the direction Y and a block 11 movable in the direction X. The optical fiber sensor 2 is fixed on a holder 5 which extends rearward to a slider 6 and is connected to the slider 6. The slider 6 is movable back and forth in the direction Y by means of rollers 8 which move on a pair of cylindrical guide rails 7 extending in the direction Y.

The block 11 is beneath the guide rails 7 and integral therewith, and rotatably supports front and rear pulleys 12 and 13 at front and back sides thereof. The rear pulley 13 concentrically slidably meshes with a spline shaft 14 extending in the direction X, so that the rear pulley 13 is movable in the direction X together with the block 11. The block 11 is provided with rollers 9 at a front end thereof. The rollers 9 are movable on guide rails 10 having a rectangular cross section and extending in the direction X. Thus, the block 11 is adapted to move back and forth in the direction X.

The rear pulley 13 is belt-driven into rotation by a motor 15 so that the rear pulley 13 rotates together with the spline shaft 14. The rotation of the rear pulley 13 is transmitted to the front pulley 12 by means of a belt 16. The belt 16 is fixed to a depending portion 6*a* of the slider 6 so that the slider 6 is moved back and forth when the belt 16 is rotated. Thus, the slider 6 carrying the optical fiber sensor 2 thereon is movable in effect in the directions X and Y.

A long belt 17 extending in the direction X is fixed to the block 11 so that the block 11 moves together with the optical fiber sensor 2 in the direction X when the belt 17 is driven into rotation by a motor 18. The block 11 is provided with a pointer 19 (FIG. 2) above the optical fiber sensor 2.

In the vicinity of the drive mechanism 20, there is provided a software section 21 for specifying a position of the optical fiber sensor 2, which software section 21 includes an I/O board, driver, power supply unit, and CPU board. A case 22 houses the drive mechanism 20 and the software section 21 and has a handle 23 (FIG. 2) on an exterior side wall 22*a* thereof. The handle 23 allows one to carry around the whole apparatus 1 from one place to another.

The drive mechanism 20 may take another form wherein the optical fiber sensor 2 is mounted to the tip end of a rotatable lever coupled to a shaft of a motor, not shown, and the positioning of the optical fiber sensor in the direction Y is effected by operating the rotating lever and the positioning in the direction X is effected by means of guide rails, as discussed above.

An upper wall 22*b* of the case 22 is formed with a rectangular opening 24 therein extending in the direction X such that the optical fiber sensor 2 is within the projected area of the opening 24. The rectangular opening 24 extends in the direction X. A plurality of positioning pins 25 project outwardly upwardly from the upper wall 22*b* of the case 22, and are aligned at equal intervals L on both longitudinal sides of the opening 24. The positioning pins 25 are aligned in the direction X along the opening 24 and in parallel to the guide rails 10 and the spline shaft 14. The positioning pins 25 opposing across the opening 24 are also aligned in the direction Y, parallel to the guide rails 7.

A magnet rubber 26 is laid around the positioning pins 25. The upper wall 22*b* is formed with a display window 27 in which the pointer 19 appears. The pointer 19 indicates to the operator a particular housing 3 having a terminal cavity 4 which is indicated by the optical fiber sensor 2. A plurality of connector-receiving plates 28 are placed side-by-side over the opening 24 and engage the positioning pins 25. The magnet rubber 26 ensures secure connection of the connector-receiving plates 28 to the upper wall 22*b*.

Figure 3:
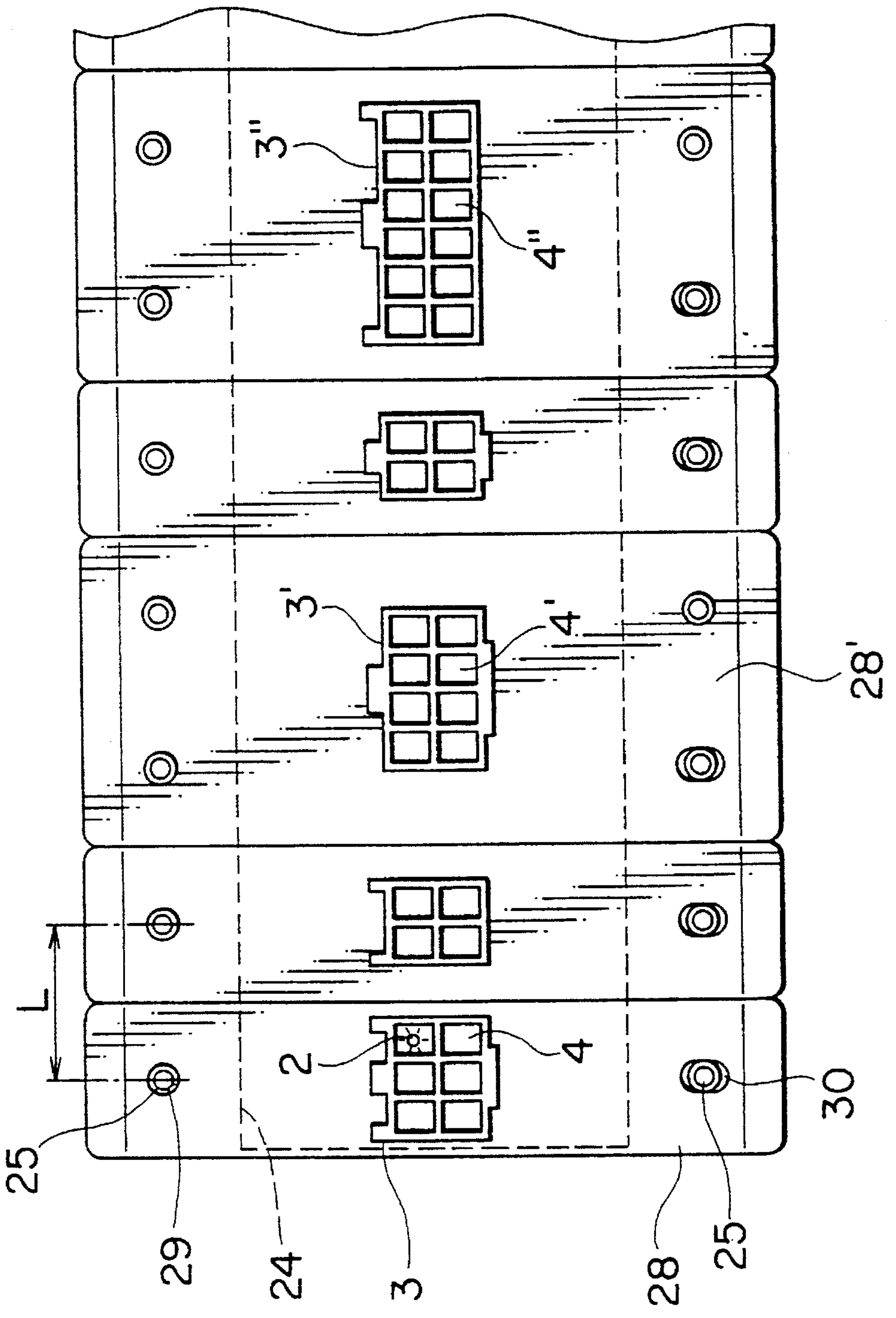
FIG. 3 shows a plurality of connector-receiving plates as being aligned side by side over the opening.

FIG. 3 shows a plurality of connector-receiving plates 28 as being aligned side-by-side over the opening 24. The positioning pins 25 are aligned at equal intervals and snugly engage pin-engaging holes 29 and 30. The respective connector-receiving plates 28 are detachable to the positioning pins 25.

Figure 4:
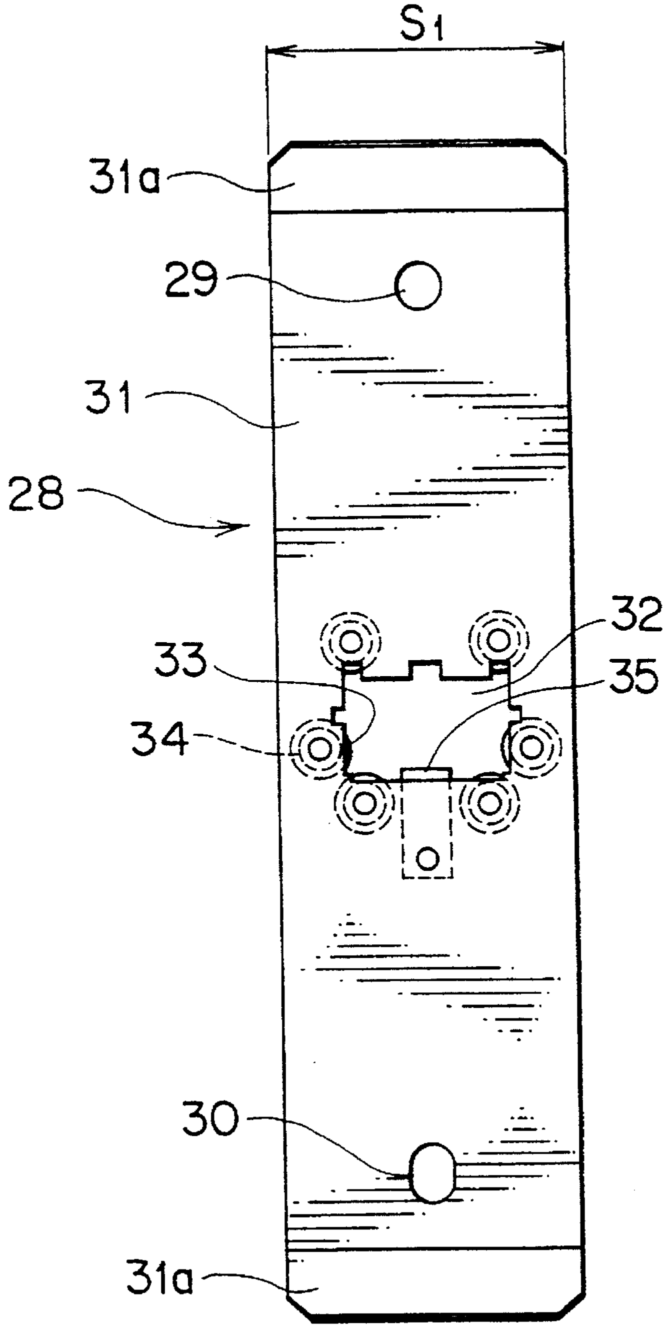
FIG. 4 shows an example of a connector-receiving plate.
Figure 5:
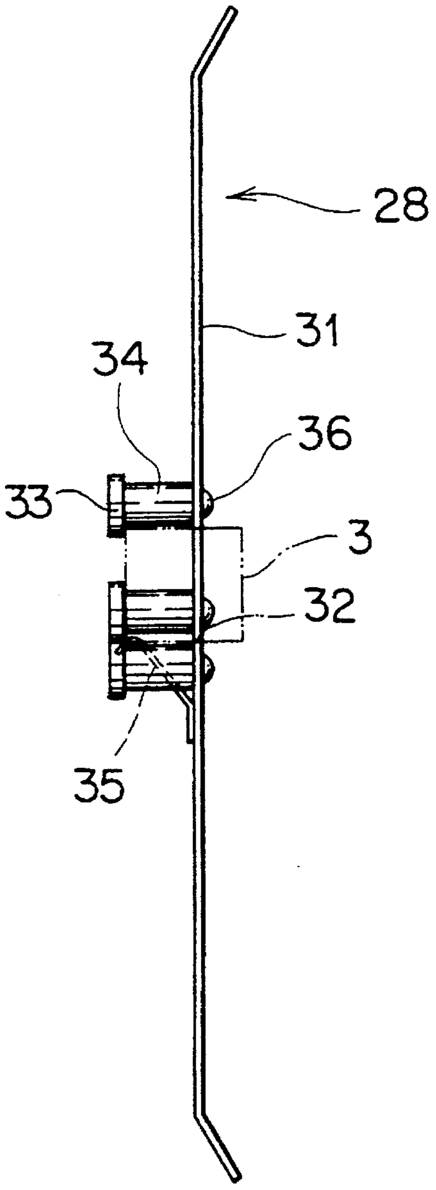
FIG. 5 shows a side view of FIG. 4.

The connector receiving plate 28, as shown in FIGS. 4 and 5, includes a plate-like metal body 31 formed with a connector-receiving hole 32 in the middle thereof and pin-engaging holes 29 and 30 formed in respective longitudinal end portions thereof. A plurality of connector-supporting columns 34 are fixed to the body 31 by means of screws 36. Each of the columns 34 has a connector-receiving seat 33 and depends from the body 31. A leaf spring 35 is provided on the body 31 to urge the side wall of the housing 3 inserted into the connector-receiving hole 32. The connector-receiving plate 28 is punched through to make connector-receiving holes 32 therein that are configured to the front projected contour of the housing 3, as shown in FIG. 3. Thus, the shapes of the connector-receiving hole 32 on the respective connector-receiving plates are different according to the type of housing of a connector, thereby preventing wrong insertion of connector. The pin-engaging hole 29 is a circular hole while the pin-engaging hole 30 is an elongated hole so that the pin-engaging hole 30 accommodates dimensional errors when assembling, thereby ensuring smooth, prompt engagement of the connector-receiving plate 28 with the positioning pins 25. The longitudinal ends 31*a* of the body 31 are formed to turn up, like a skid, which facilitates installation and removal operations of the connector-receiving plate 28.

The connector-supporting column 34 has a connector-receiving seat 33 as shown in FIG. 5. The connector-supporting column 34 is cylindrical and its circumferential wall contacts the side wall of the housing 3. When the housing 3 is inserted into the hole 32, the connector-receiving seats 33 abut the bottom of the housing 3 to hold the housing 3 thereat and the leaf spring 35 resiliently urges the side wall of the housing to fix the housing 3. The installation and removal operations of the housing 3 may be effected easily and smoothly by simply inserting the housing 3 into, or pulling it out of, the connector-receiving hole 32.

Figure 6:
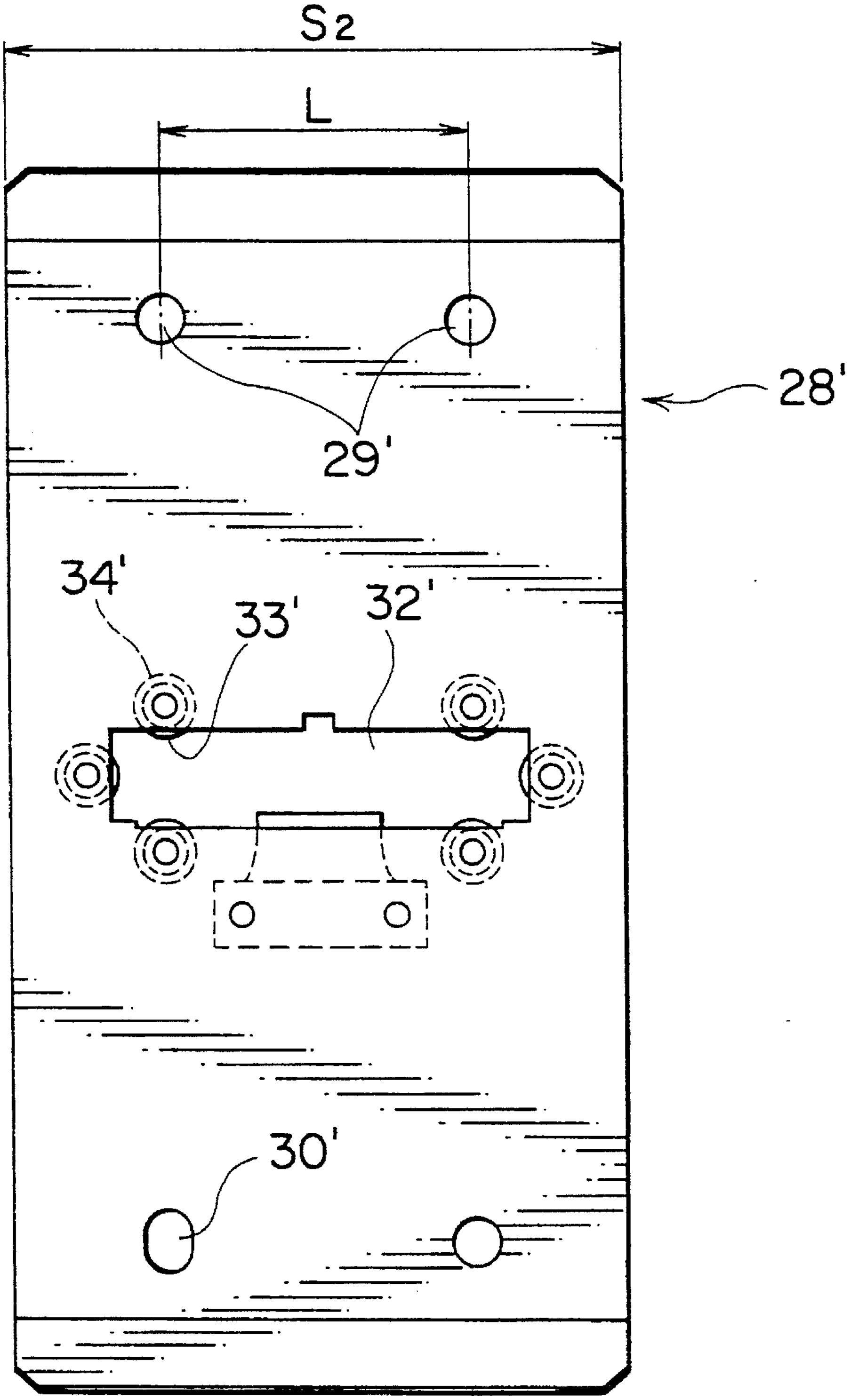
FIG. 6 shows another connector-receiving plate.

The lateral dimension S1 of the connector-receiving plate 28 is substantially the same as, or slightly smaller than, the pitch L between the positioning pins 25. The connector-receiving plate 28' shown in FIG. 6 has laterally aligned pin-engaging holes 29' spaced apart by the same distance as the pitch L between the positioning pins 25. The width S2 of the connector-receiving plate 28' is twice as large as the pitch L between the positioning pins 25 or less than twice the pitch L. The connector-receiving plate 28' is formed with a longitudinal connector-receiving hole 32' therein into which a longitudinally shaped housing 3' is inserted in position. The connector-receiving hole 32' has a shape that conforms with the front projected contour of the housing 3 as shown in FIG. 3. The shapes of the columns 34' and leaf spring 35' for supporting the housing 3' are the same as those in FIG. 4. One of the four pin-engaging holes 29' is an elongated hole 30'.

As shown in FIG. 3, the housings 3, 3', . . . of different sizes and shapes are aligned side-by-side and supported by the respective connector-receiving plates 28, 28, . . . When supporting a housing which extends further laterally than the housing 3'', a connector-receiving plate 28 may be used which has pin-engaging holes 29' spaced apart by a distance twice the pitch L or a distance of a multiple of the pitch L.

Figure 7:
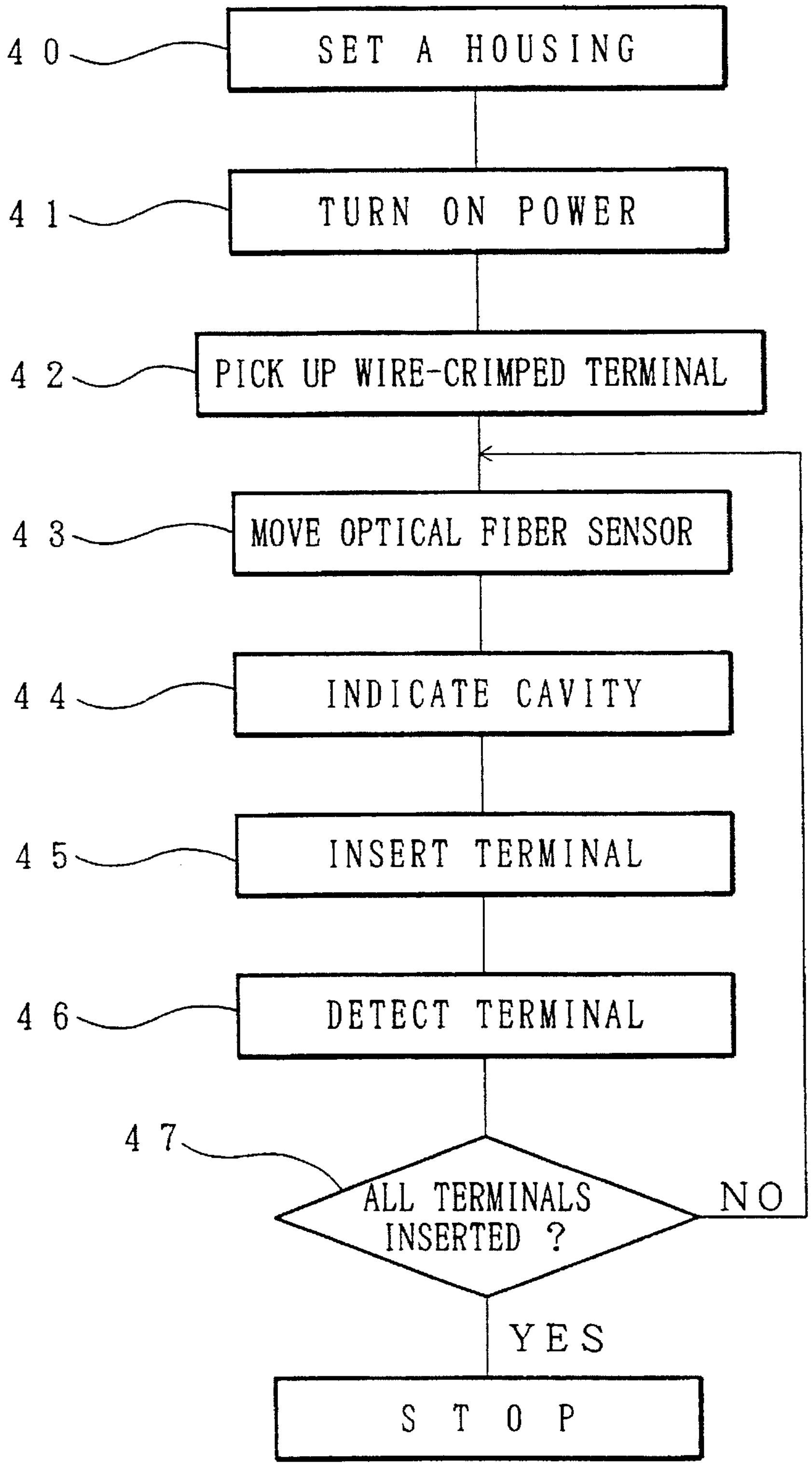
FIG. 7 is a flowchart illustrating the operation of inserting wire-crimped terminals into the cavities.
Figure 8:
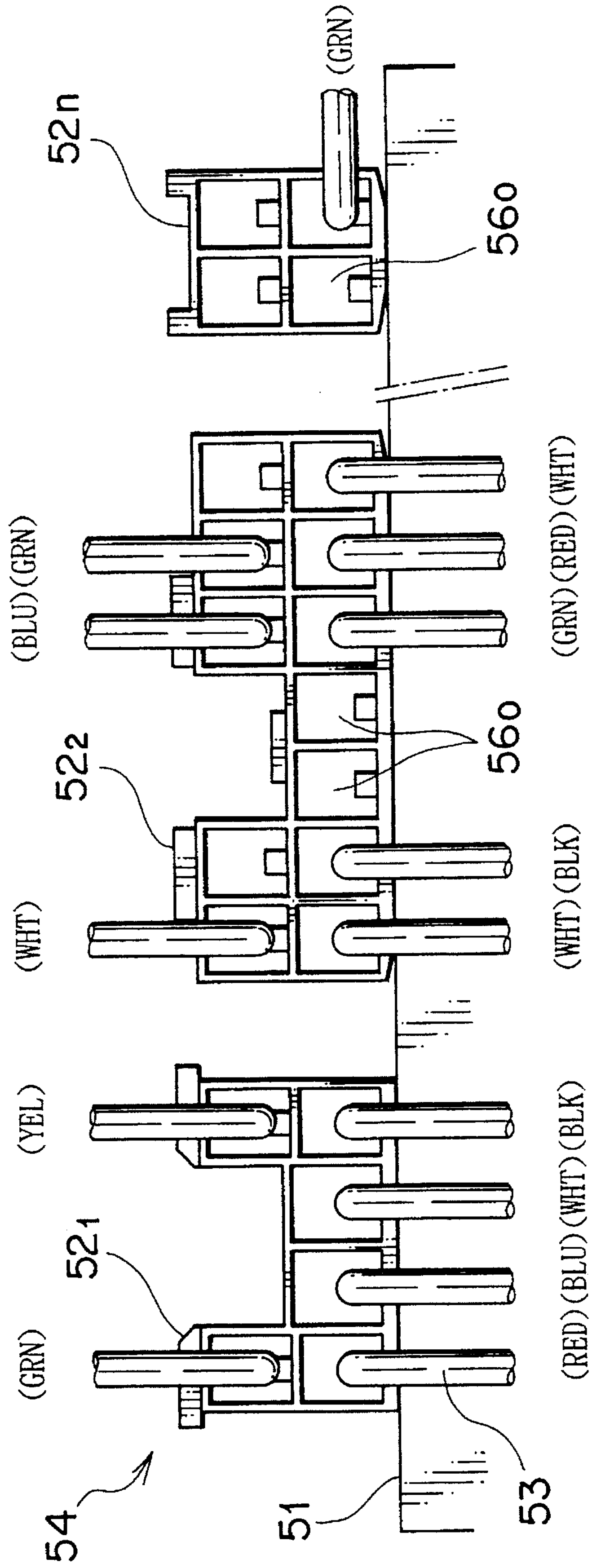
FIG. 8 PRIOR ART
FIG. 8 is a top view showing a sample of a prior art sub harness placed on a sample platform.
Figure 9:
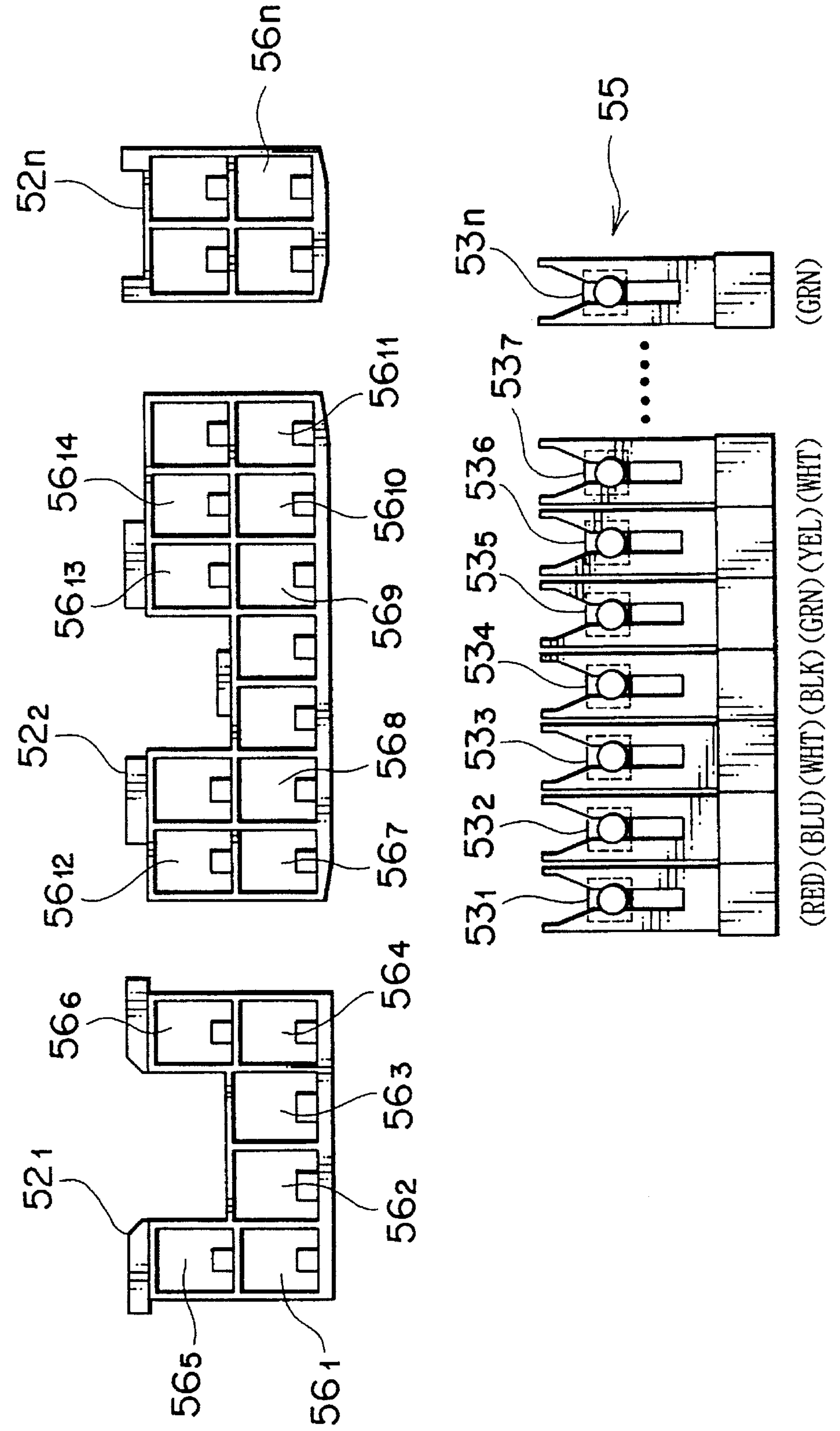
FIG. 9 PRIOR ART
FIG. 9 shows a prior art assembly stage where the wire-crimped terminals are inserted into the cavities of respective housings.

FIG. 7 is a flowchart illustrating the insertion operation of the wire-crimped terminals carried out by the operator. After setting the housings 3 into the connector-receiving plates 28 at step 40, the operator turns on electric power for the apparatus at step 41 and pushes a selector button, not shown, according to the type of the sub-harness, so that the software section 21 specifies the order in which terminals are inserted. Different insertion orders are stored for different sub-harnesses in the software section 21. The operator then picks up a wire-crimped terminal at step 42. The wire-crimped terminals may be either those delivered one after another from the preceding manufacture stage or line, or those from wire-carrying banks, each carrying different wires, delivered in batch mode from a separate production line.

Upon turning on the power at step 41, the drive mechanism 20 drives, at step 43, the optical fiber sensor 2 in the directions X and Y to a position immediately below the terminal cavity 4 into which the wire is to be inserted. The optical fiber sensor 2 transmits light to indicate to the operator the terminal cavity 4 into which the wire is to be inserted at step 44, and allows the operator to visually check the illuminating optical fiber sensor 2 from above the housing 3.

At step 45, the operator inserts the wire-crimped terminal into the terminal cavity 4 illuminated by the optical fiber sensor 2. The inserted terminal blocks the light from the optical sensor 2 so that at step 46 the optical fiber sensor 2 detects the insertion of the terminal. Then, the optical fiber sensor 2 is moved to the next terminal cavity 4'. The aforementioned steps 43–46 are repeated until the software section 21 determines that, at step 47, all the wire-crimped terminals have been inserted into the cavities 4. The software section 21 then terminates the driving of the optical fiber sensor 2. The software section 21 then informs the operator by means of a buzzer, or the like, not shown, that the sub-harness has been completed.

Industrial applicability

The operator only needs to follow the optical fiber sensor which indicates to the operator a cavity into which a wire-crimped terminal is to be inserted. This way of assembling a sub-harness eliminates the need for making samples of sub-harness of different types or models, and simplifies the management of samples. Further, the operator need not be well trained or familiar with individual samples prior to insertion operation of wire-crimped terminals. Since the apparatus indicates to the operator step-by-step the cavities into which wire-crimped terminals are to be inserted, the operator need not identify the cavities by the colors of the wires inserted in the sample. This allows use of wires of the same color, simplifying the manufacture, purchase, and management of wires. This leads to reduction in manufacturing cost of sub-harnesses.

The optical fiber sensor 2 serves as a pacemaker to allow the operator to work at most efficient speeds. Guiding the operator by illuminating the cavity into which a wire-crimped terminal is to be inserted, allows insertion of terminals in some more random order than in the conventional assembly apparatus where terminals should be inserted in a relatively more restricted order for preventing human error, for example, from left to right of lower rows of cavities and from left to right of higher rows. This eliminates the need for arranging wire-crimped terminals on the wire-carrying banks in the order of insertion every time a different sub harness is to be manufactured.

The whole apparatus can be carried around to anywhere and, therefore, sub-harnesses may be assembled at a production line away from the production line where wire-crimped terminals are manufactured. Wrong insertion of housings can be prevented by the connector-receiving holes that are configured to the front projected contours of specific housings.

What is claimed is:

1. An apparatus for guiding the insertion of a terminal into a terminal cavity of a housing of a connector-receiving plate, said apparatus comprising:

a plurality of walls forming a case;

one of said walls containing an opening;

means on said case operative to attach said connector-receiving plate in overlying relation with respect to said opening;

an optical fiber sensor disposed within said case and mounted for movement in spaced underlying relation with respect to said housing;

a drive mechanism within said case operative to reversibly drive said optical fiber sensor along first and second orthogonal directions to position said sensor in alignment with selected cavities in said housing for illuminating the interior thereof; and a controller for controlling said drive mechanism to selectively position said optical fiber sensor.

2. The apparatus according to claim 1, wherein said drive mechanism includes:

at least one first guide rail extending in the second direction;

a slider carrying said optical fiber sensor thereon, said slider being movable along said first guide rail;

a first drive means for reversibly driving said slider to move along the first guide rail;

a spline shaft extending in the first direction;

a second guide rail extending in parallel with said spline shaft;

a block for carrying said first guide rail, said slider, and said first drive means thereon, said block being supported on said spline shaft and second guide rail and being movable along said spline shaft; and a second drive means for reversibly driving said block to move along said spline shaft.

3. The apparatus according to claim 2, wherein said first drive means is a first belt arrayed between two pulleys aligned in the second direction, said first belt being fixed to said slider to drive said slider back and forth in the second direction when the pulleys are driven by a first external drive source, and said second drive means is a second belt fixed to said block to move said block along said spline shaft when the second belt is driven by a second external drive source.

4. The apparatus according to claim 1, in which said connector-receiving plate contains a plurality of pin-receiving holes (32); and a plurality of positioning pins equally spaced and aligned along the periphery of said opening, said positioning pins being operative to engage the pin-engaging holes in said connector-receiving plate for attaching said connector-receiving plate to said case.

5. The apparatus according to claim 4, wherein said connector-receiving plate is provided with a connector-receiving hole formed therein, said connector-receiving hole being configured to a front projected contour of said housing;

a plurality of columns depending from said plate about the periphery of said connector-receiving hole, each of said columns having a connector-seat at a distal end thereof for receiving said housing when said housing is inserted into said connector-receiving hole and an urging means for urging said housing to firmly hold said housing when said housing is inserted into said connector receiving hole.

6. The apparatus according to claim 5, wherein said urging means is a leaf spring which presses said housing to firmly hold said housing.

7. The apparatus according to claim 4 or 5, wherein said pin-engaging holes are formed at intervals equal to a multiple of the spacing between adjacent positioning pins.

8. The apparatus according to claim 1 wherein said controller includes means for moving said optical fiber sensor to a subsequent housing cavity in the operation sequence when light passed to a terminal-receiving cavity is obstructed by insertion of said terminal into said terminal-receiving cavity.

* * * * *